United States Patent
Wilhelm et al.

(10) Patent No.: US 7,244,806 B2
(45) Date of Patent: Jul. 17, 2007

(54) METHOD AND DEVICE FOR THE CONTINUOUS PRODUCTION OF POLYESTERS

(75) Inventors: Fritz Wilhelm, Karben (DE); Michael Reisen, Frankfurt am Main (DE)

(73) Assignee: Zimmer Aktiengesellschaft, Frankfurt am Main (DE)

( * ) Notice: Subject to any disclaimer, the term of this patent is extended or adjusted under 35 U.S.C. 154(b) by 0 days.

(21) Appl. No.: 10/530,216

(22) PCT Filed: Sep. 19, 2003

(86) PCT No.: PCT/EP03/10444

§ 371 (c)(1),
(2), (4) Date: Mar. 30, 2005

(87) PCT Pub. No.: WO2004/033526

PCT Pub. Date: Apr. 22, 2004

(65) Prior Publication Data

US 2006/0009608 A1    Jan. 12, 2006

(30) Foreign Application Priority Data

Oct. 2, 2002 (DE) .............................. 102 46 251

(51) Int. Cl.
*C08G 64/00* (2006.01)
(52) U.S. Cl. ...................... 528/272; 502/150; 528/271; 528/279; 528/480

(58) Field of Classification Search ................. 502/150; 528/271, 272, 279, 480
See application file for complete search history.

(56) References Cited

U.S. PATENT DOCUMENTS 4,128,544 A * 12/1978 Schneider ................... 534/625

* cited by examiner

*Primary Examiner*—Terressa Boykin
(74) *Attorney, Agent, or Firm*—Andrew Wilford

(57) ABSTRACT

In the continuous production of polyesters, the esterification/transesterification of dicarboxylic acids or esters of the dicarboxylic acids with diols is performed in at least one reaction stage, the prepolycondensation of the esterification/transesterification product is performed under a vacuum in a reaction stage consisting of a vertical tube, and the polycondensation of the prepolycondensation product is performed in at least one reaction stage. To be able to perform the prepolycondensation in a reaction stage, while at the same time increasing the viscosity of the prepolycondensation product and decreasing the process temperatures, the esterification/transesterification product flowing into the prepolycondensation reactor successively traverses in a free movement under limited heating first at least one first reaction zone formed of an annular channel, is then introduced into the radially outer ring duct of at least one second reaction zone formed of an annular channel divided into a plurality of concentric ring ducts, thereafter is successively passed through the ring ducts to the outlet, and is then introduced into a stirred third reaction zone located at the bottom of the vertical tube.

25 Claims, 1 Drawing Sheet

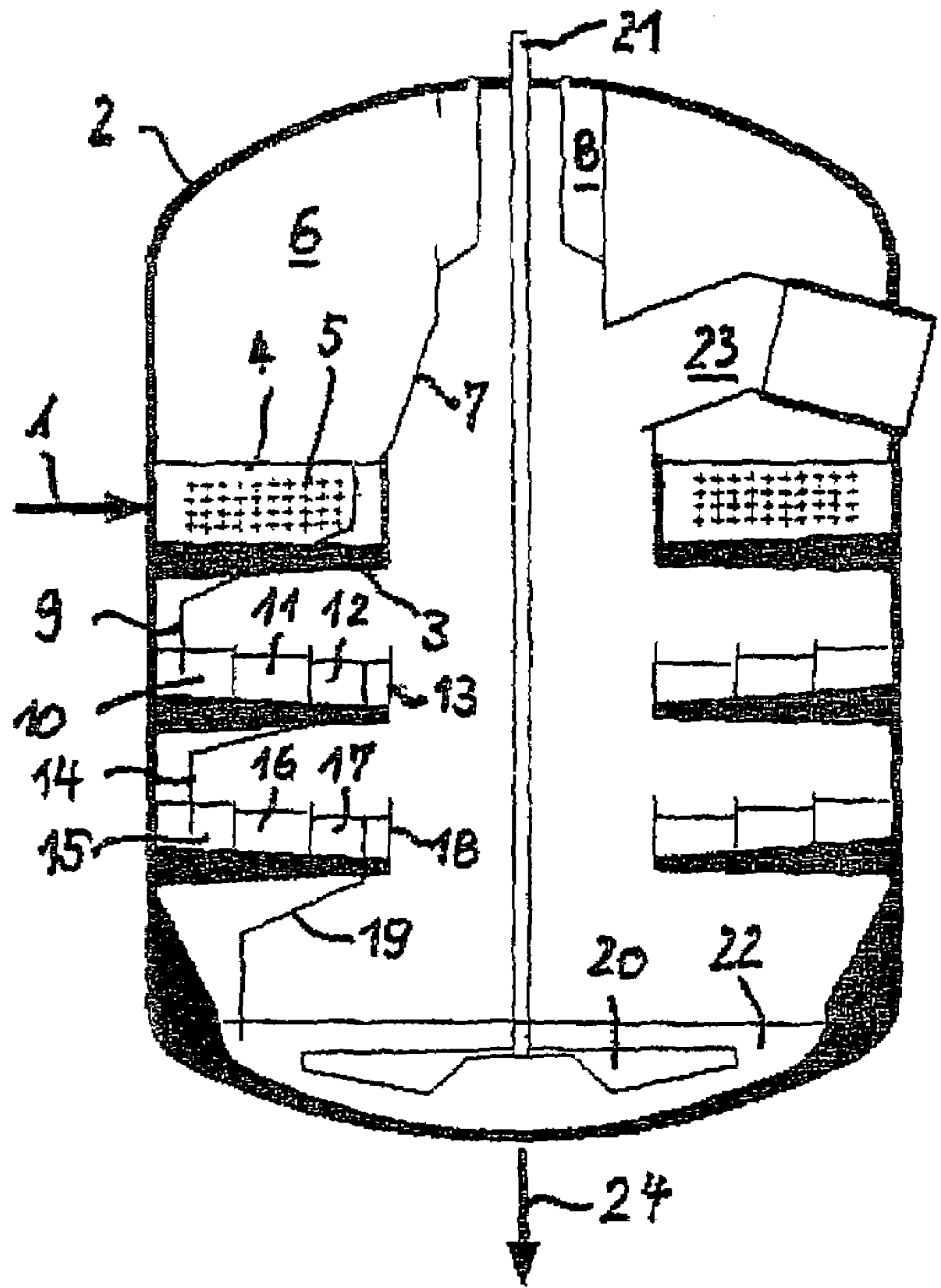

METHOD AND DEVICE FOR THE CONTINUOUS PRODUCTION OF POLYESTERS

CROSS REFERENCE TO RELATED APPLICATIONS

This application is the US national phase of PCT application PCT/EP2003/010444, filed 19 Sep. 2003, published 22 Apr. 2004 as WO 2004/033526, and claiming the priority of German patent application 10246251.8 itself filed 2 Oct. 2002.

FIELD OF THE INVENTION

This invention relates to a process and an apparatus for the continuous production of polyesters (PES) by esterification/transesterification of dicarboxylic acids or dicarboxylic acid esters with diols, preferably polyethylene terephthalate (PET), proceeding from terephthalic acid (PTA) or dimethyl terephthalate (DMT) and ethylene glycol (EG), in at least one reaction stage, prepolycondensation of the esterification/transesterification product under a vacuum by means of a reaction stage consisting of a vertical reactor, and polycondensation of the prepolycondensation product in at least one polycondensation stage.

BACKGROUND OF THE INVENTION

For the continuous production of PET, PTA or dimethyl terephthalate (DMT) and EG are used as starting substances. PTA is mixed with EG and a catalyst solution to form a paste and charged to a first reaction stage for esterification, in which esterification is effected at atmospheric or superatmospheric pressure by separating water. When DMT is used, the DMT melt and the catalyst together with the EG are supplied to a first reaction stage for transesterification, in which the reaction is effected at atmospheric pressure by separating methanol (MeOH). The product stream of the esterification/transesterification is supplied to a reaction stage for prepolycondensation, which generally is performed under a vacuum. The product stream from the prepolycondensation is introduced into a reaction stage for polycondensation. The polyester melt obtained is directly processed to obtain fibers or chips.

The conventional process for producing PET comprises two stirring stages each for esterification and prepolycondensation and a horizontal cascade reactor for polycondensation, which includes bottom chambers and a stirrer equipped with vertical perforated or ring disks on a horizontal shaft for the purpose of producing a defined surface. The disadvantages of this process must in particular be seen in that inside the cascade reactor comparatively high temperatures of 284 to 288° C., which are disadvantageous for the quality, occur with sufficiently large flow rates. The vacuum applied in the first stirring stage of the prepolycondensation to avoid foaming and entrainment of droplets is limited to $p \geq 50$ mbar. The viscosity of the prepolycondensation product likewise is limited to a range of 0.20 to 0.24 IV. What is furthermore disadvantageous is the increased gas yield in the cascade reactor forming the polycondensation stage. The use of a horizontal cascade reactor instead of the second stirring stage for prepolycondensation allows a high flexibility of the PET production with comparatively lower temperatures of 277 to 283° C. in the cascade reactor for polycondensation and an increased viscosity of the prepolycondensation product of 0.27 to 0.31 IV as well as optimum possibilities for increasing the plant capacity (Schumann, Heinz-Dieter: Polyester producing plants: principles and technology. Landsberg/Lech: Verlag Moderne Industrie, 1996, pp. 27 to 33). What remains disadvantageous, however, are the high investment costs for the apparatus involved and the company building.

In a plant comprising two stirred tanks for esterification, a multilevel reactor for prepolycondensation and a horizontal cascade reactor for polycondensation, a comparable stability and flexibility of the polyester production is obtained with relatively little effort, but with the disadvantage that the dimensions of the reactors of the prepolycondensation and polycondensation stages will be increased because of increased vapor volumes, and the admissible transport dimensions are reached already with mean plant capacities.

In the process of producing PET by means of four reaction stages, which is described in DE-C-4415220, a vertical reactor is used each for postesterification and prepolycondensation. In its initial upper region, the reactor has a helical duct with product inlet at the wall, which is open at the top and, extending from the outside to the inside, communicates via a central overflow with a stirred product sump disposed at the bottom, the duct bottom ascending continuously in flow direction, so that the depth of the product stream is decreasing continuously. Heating the product stream is effected by means of individual radiators initially repeated at intervals and optionally via the duct walls. By means of the duct bottom ascending in flow direction an automatic system evacuation in flow direction is prevented with the consequence of the formation of residues, quality deterioration or product losses, in particular in the case of operating troubles or when shutting down the production plant. Due to the evaporation surface limited by a single duct bottom, the operating vacuum is either restricted, the operating temperature is increased, the color quality of the product produced is decreased, or an increased vacuum involves the risk of an excessive vapor velocity and an entrainment of droplets critical for a trouble-free condensation; this effect is intensified in addition by locally concentrated radiators in the flow duct.

U.S. Pat. No. 5,464,590 discloses a vertical polymerization reactor with a plurality of trays disposed vertically one above the other, which each have two flow ducts open at the top at the respective duct end, and an overflow weir with adjoining bottom recess for the vertical transfer of product in the form of a freely falling film on the succeeding tray. The duct has the shape of an approximately ring-shaped double loop, the respective first loop semicircularly being deflected into the second opposed loop. The liquid polymer traverses the ducts from the top to the bottom in a free movement. The vapors each flow between the trays towards the middle of the reactor and escape via central tray apertures to the vapor outlet at the reactor lid. A low filling level on the trays and a heating restricted to the bottom region involve a dwell time deficit for the prepolycondensation of esterification products with restricted polymer degrees of 4.5 to 7.5 with the consequence that either the number of trays or the dimensions of the reactor must be increased. Another disadvantage must be seen in that reaction space is lost due to the incorporation of guides and free falling-film zones. Due to the horizontal arrangement of the duct bottoms and due to the overflow weirs, a residue-free continuous operation of the reactor and/or its complete drainability are not ensured.

The same disadvantages are also obtained with the polymerization reactor represented in U.S. Pat. No. 5,466,419, in which the product charged to the first ring duct is divided in two partial streams, which each traverse two semicircular loops and half a distance up to the flow reversal and the overflow weir or the product outlet, i.e. with a comparable duct cross-section the flow velocity likewise is halved and the hydrostatic pressure difference is reduced.

OBJECT OF THE INVENTION

It is the object of the present invention to perform the prepolycondensation in the above-described process for producing PES in a reaction stage and at the same time increase the viscosity of the prepolycondensation product to 0.24 to 0.26 IV at a lower process temperatures of 268, to 275° C. in the prepolycondensation stage and 276 to 282° C. in the polycondensation stage as well as a lower vacuum of 7 to 18 mbar. Furthermore, foaming and entrainment of droplets should be easy to control.

SUMMARY OF THE INVENTION

This object is solved in that the esterification/transesterification product flowing into the reactor, in which there exists a pressure of 10 to 40% of the diol equilibrium pressure of the prepolycondensation product leaving the reactor, successively traverses with a constant product height in a free movement under limited heating first at least one first reaction zone formed of a channel, then is introduced into the radially outer or radially inner ring duct of at least one second reaction zone formed of an annular channel divided into a plurality of concentric ring ducts, and with a constant product height is successively passed through the ring ducts to the outlet and then into a stirred third reaction zone located at the bottom of the reactor. Due to the arrangement of a first and a second reaction zone, a sufficiently large evaporation surface and hence a restriction of the vapor load is achieved.

The total pressure of the reaction product at the bottom of the channels of the first and second reaction zones, which results from the hydrostatic pressure and the operating pressure, is smaller than the local diol equilibrium pressure of the polycondensation stage and is about 5 to 80%, preferably about 10 to 70% of the diol equilibrium pressure. As a result, reproducible polycondensation conditions can be achieved in a relatively simple way. For the EG equilibrium pressure the following applies: $p_{GL}=4p_{S,T}[(DP)^2-1]^{-1}$, where $p_{S,T}$ designates the EG-vapor pressure and DP designates the degree of polymerization.

At comparable relative total pressures, the product height in the ring ducts of the second reaction zone is lower than the product height in the channel of the first reaction zone by the factor of 2 to 3.5.

Usually, the vapors formed in the three reaction zones are jointly withdrawn from the reactor. A preferred aspect of the invention consists in that the vapors of the first reaction zone are supplied to a separator for the entrained product droplets, before the same are combined with the vapors of the two other reaction zones. By means of this measure the foam and droplet problem can be controlled.

The flow in the channel forming the first reaction zone can be regarded as turbulent because of the vigorous generation of gas up to about half the flow path. With decreasing generation of gas and increasing viscosity of the product stream a laminar flow will be obtained in the last third of the flow path at the latest. According to the principle of the similarity of flows in open conduits, the flow of the product stream in the ring ducts of the second reaction zone is a laminar flow. To avoid the formation of a faster core flow and a slower edge flow at the bottom and at the walls of the channel of the first reaction zone as well as in the ring ducts of the second reaction zone in the case of a laminar flow, it is necessary in accordance with another feature of the invention to slow down the velocity of the core flow and to accelerate the velocity of the edge flow.

In accordance with the further aspect of the invention, the product stream is passed concurrently parallel or countercurrently parallel through the ring ducts of the second reaction stage.

In the apparatus for performing the process, a heating register extending in flow direction is arranged in the channel of the first reaction zone for the limited controlled heating of the product stream, the tubes of which heating register are retained in chamber sheets mounted transverse to the flow direction with a bottom-free and/or wall-free passage. By means of these chamber sheets the axial velocity of the product stream is slowed down in the free edge zones and relatively accelerated in the vicinity of the heating register and at the bottom. Conversely, by means of flow installations in the succeeding laminar conduit flows the slower velocity at the edge and at the bottom is accelerated and decelerated in the faster core flow.

In accordance with the particular aspect of the apparatus, a closed vapor collecting space is provided above the channel of the first reaction zone, whose outlet opening is connected with a separator, preferably including a cyclone-like gas conduit, for the entrained product droplets.

To achieve a constancy of the product levels in the channel of the first reaction zone and in the ring ducts of the second reaction zone, overflow baffle plates or overflow tubes are mounted at the end of the channels or ring ducts in accordance with an additional feature of the invention, and expediently an underflow baffle plate should be provided upstream of each overflow baffle plate and a riser should be provided upstream of each overflow tube, in order to avoid separation effects or residues.

To provide for an automatic and complete, i.e. residue-free evacuation of the channel of the first reaction zone and of the ring ducts of the second reaction zone of the reactor when shutting off the apparatus for producing PES, the arrangement of a gooseneck outlet at the deepest point of the bottom is provided at the end thereof among several possible concepts in accordance with another feature of the invention.

In accordance with another feature of the invention a drainage tube or interposed drainage openings are additionally arranged at the ends of channel and/or ring ducts in the rearmost dead corner at the deepest point of the bottom, in order to avoid an accumulation of residues.

Expediently, the bottom of the channel of the first reaction zone and/or that of the channel forming the ring ducts of the second reaction zone is inclined at an angle of 0.5 to 6°, preferably 1 to 4° with respect to the horizontal plane.

One aspect of the apparatus consists in that the stirrer for the third reaction zone is a ground-running impeller, a finger, frame or drum stirrer, each with a vertical drive axle.

Alternatively, the stirrer for the third reaction zone can be part of a rotary-disk cascade or a cage reactor, each with a horizontal drive axle. The rotary-disk cascade includes perforated, ring or solid disks, the inlet for the reaction product being half mounted at each of the axial ends and the common outlet being mounted in the middle. In the case of a rotary-disk cascade with perforated disks, it is also possible to arrange the inlet for the reaction product at the one end and to arrange the outlet at the opposite end.

BRIEF DESCRIPTION OF THE DRAWING

The invention is shown in the drawing by way of example and will be explained below. The sole FIGURE of the drawing is a partly schematic vertical section through an apparatus for carrying out the method of this invention.

SPECIFIC DESCRIPTION

As shown in the drawing, an esterification product for prepolycondensation is supplied via a conduit 1 to a vertical reaction vessel 2 into a radially extending channel or trough 3 which is arranged therein and forms the first reaction zone. In the channel 3 there is a heating register 4 having tubes 5 arranged concentrically. For forming a vapor-collecting space 6, the channel 3 is extended at the top by a wall 7 extending concentrically between the radial outer channel wall and the reaction vessel 2. Product droplets entrained from the vapor-collecting space 6 are separated in a cyclone-like separator 8. The product leaving the channel 3 flows via an overflow tube 9 to an outside edge of an external ring duct 10 and then flows through two further ring ducts 11, 12 forming with the duct 10 the first portion 13 of the second reaction zone. Upon traversing the ring ducts 10, 11, 12, the product flows through an overflow tube 14 at the end of the innermost ring duct 12 into the external ring duct 15 of a channel including two further ring ducts 16, 17 and forming the second portion 18 of the second reaction zone. At the end of the innermost ring duct 17, the product flows via the overflow tube 19 to the sump 22 forming the third reaction zone at the bottom of the vessel 2 and is stirred by means of an impeller 20 with a vertical drive axle 21. The vapors obtained in the three reaction zones pass to the outside via a conduit 23. The prepolycondensation product is discharged from the sump 22 via a conduit 24 and supplied to an unillustrated polycondensation stage.

The invention claimed is:

1. In a process for the continuous production of polyesters (PES) by esterification/transesterification of dicarboxylic acids, or esters of the dicarboxylic acids with diols, in at least one reaction stage, prepolycondensation of the esterification/transesterification product under vacuum by means of a reaction stage consisting of a vertical reactor, and polycondensation of the prepolycondensation product in at least one polycondensation stage, the improvement comprising the steps of:
   flowing the esterification/transesterification product into the vertical reactor and maintaining in the vertical reactor a pressure of 10 to 40% of the diol equilibrium pressure of the prepolycondensation product leaving the reactor and a process temperature of 268 to 274° C.; and
   successively passing the esterification/transesterification product in a free movement without stirring under limited heating first through at least one first reaction zone formed of an annular channel, then into the radially outer or the radially inner ring duct of at least one second reaction zone formed of an annular channel divided into a plurality of concentric ring ducts where the product passes successively through the ring ducts to the outlet and then into a stirred third reaction zone located at the bottom of the reactor.

2. The process as claimed in claim 1, characterized in that the total pressure of the reaction product at the bottom the channels of the first and second reaction zones is smaller than the local diol equilibrium pressure of the polycondensation product.

3. The process as claimed in claim 1, characterized in that the total pressure of the reaction product at the bottom of the channels of the first and second reaction zones is 5 to 80% of the local diol equilibrium pressure of the polycondensation product.

4. The process as claimed in claim 1, characterized in that the vapors formed in the three reaction zones are jointly withdrawn from the reactor.

5. The process as claimed in claim 1, characterized in that the vapors of the first reaction zone are supplied to a separator for the entrained product droplets, before they are combined with the vapors of the two other reaction stages.

6. The process as claimed in claim 1, characterized in that the reaction product is concurrently passed in parallel through adjacent ring ducts of the second reaction zone.

7. The process as claimed in claim 1, characterized in that the reaction product is countercurrently passed in parallel through the ring ducts of the second reaction zone.

8. The process as claimed in claim 1, characterized in that the product level of the stirred third reaction zone is controlled.

9. The process as claimed in claim 1, characterized in that the product level in the channel of the first reaction zone and in the ring ducts of the second reaction zone is kept constant.

10. The process as claimed in claim 1, characterized in that the product level in the ring ducts of the second reaction zone is lower than in the channel of the first reaction zone by a factor of 2 to 3.5.

11. An apparatus for performing the process as claimed in claim 1, characterized by a heating tube register arranged in the channel of the first reaction zone and extending in flow direction, whose tubes are retained in chambering sheets mounted transverse to the flow direction.

12. The apparatus as claimed in claim 11, characterized by a closed vapor collecting space mounted above the channel of the first reaction zone, whose outlet opening is connected with a separator for the entrained product droplets.

13. The apparatus as claimed in claim 10, characterized by an overflow baffle plate or overflow tube arranged at the end of the channel of the first reaction zone.

14. The apparatus as claimed in claim 10, characterized by an overflow baffle plate or overflow tube arranged at the end of each ring duct of the second reaction zone.

15. The apparatus as claimed in claim 10, characterized in that an underflow baffle plate or a riser is provided upstream of each overflow baffle plate or overflow tube.

16. The apparatus as claimed in claim 11, characterized by a gooseneck outlet with drainage bypass and vent tube each arranged at the deepest point of the bottom at the end of the channel of the first reaction zone or at the end of the last ring duct of the second reaction zone.

17. The apparatus as claimed claim 11, characterized by a drainage opening each located at the deepest point of the bottom at the end of the channel of the first reaction zone or at the end of each ring duct of the second reaction zone.

18. The apparatus as claimed in claim 11, characterized in that guide plates are arranged in the ring ducts of the second reaction zone.

19. The apparatus as claimed in claim 11, characterized in that the bottom of the channel of the first and/or second, reaction zone is inclined at an angle of 0.5 to 6 with respect to the horizontal plane.

20. The apparatus as claimed in claim 11, characterized in that the stirrer for the third reaction zone consists of a ground-running impeller, finger, frame or drum stirrer, each with a vertical drive axle.

21. The apparatus as claimed in claim 11, characterized in that the stirrer for the third reaction zone includes a rotary-disk stirrer or a cage stirrer, each with a horizontal drive axle.

22. The apparatus as claimed in claim 21, characterized in that the rotary-disk stirrer is equipped with perforated, ring or solid disks.

23. The apparatus as claimed in claim 22, characterized in that in a rotary-disk cascade the inlet for the reaction product is half mounted at each of the axial ends, and the common outlet is mounted in the middle.

24. The apparatus as claimed in claim 22, characterized in that in the rotary-disk cascade with perforated disks the inlet for the reaction product is mounted at the one end and the outlet is mounted at the opposite end.

25. The apparatus as claimed in claim 10, characterized by one stationary partial stream drainage each mounted at the bottom at the ends of the channels and of the ring ducts.

* * * * *